Patented Mar. 28, 1950

2,501,990

UNITED STATES PATENT OFFICE 2,501,990

ALDEHYDE REACTION PRODUCTS OF CO-POLYMERS OF VINYL ESTERS OF HYDROXY ACIDS AND ACRYLIC ESTERS

Thomas S. Carswell, Seattle, Wash., assignor to Monsanto Chemical Company, St. Louis, Mo., a corporation of Delaware No Drawing. Application September 7, 1944, Serial No. 553,114

2 Claims. (Cl. 260—73)

This invention relates to new compositions of matter comprising the reaction products of aldehydic materials with copolymers of esters of acrylic acids and vinyl esters of hydroxy acids.

Copolymers of esters of acrylic acids with vinyl esters of hydroxy acids are known. They are thermoplastic resins having high affinity for water which approaches true solubility as the ratio of hydroxy acid ester to acrylic acid ester increases.

An object of this invention is to provide new compositions of matter comprising the reaction products of aldehydic materials with copolymers of esters of acrylic acids with vinyl esters of hydroxy acids.

A further object is to provide new compositions of matter which are thermosetting and hydrophobic in character.

These and other objects are attained by reacting aldehydes, polymeric aldehydes, or aldehyde addition products with copolymers of esters of acrylic acids and vinyl esters of hydroxy acids.

Following are exemplifications of the products and processes of this invention which is not limited to the specific details set forth. Where parts are mentioned they are parts by weight.

Example I 100 parts of a methyl acrylate-vinyl lactate copolymer made by copolymerizing 20 parts of methyl acrylate with 80 parts of vinyl lactate, are dissolved in 200 parts of water. 20 parts of formaldehyde are added to the solution which is then heated under reflux conditions at atmospheric pressure for about one hour with substantially constant agitation. The reaction product precipitates in the form of a fine white powder which is washed and dried. This powdered resin (100 parts) is then blended with 2 parts hexamethylene tetramine and compression molded at 135° C. for 20 minutes at a pressure of 500 p. s. i. in a suitable mold such as a mold for producing lenses for gas masks. The molded disc is transparent, colorless, tough and moisture resistant.

The formaldehyde may be used as Formalin, paraformaldehyde or hexamethylene tetramine. If Formalin is used, the formic acid normally present acts to catalyse the condensation. If hexamethylene-tetramine is used, the ammonia released by the reaction also tends to promote the condensation. If paraformaldehyde or other polymeric forms of formaldehyde are used a condensation catalyst in the amount of about 0.05 to 1.0 part may be added to accelerate the reaction.

Example II 100 parts of a methyl acrylate-vinyl lactate copolymer made by copolymerizing 60 parts of methyl acrylate with 40 parts of vinyl lactate is mixed with 10 parts of a pulverized formaldehyde-phenol addition product in a heated Banbury mixer. The mixture is then calendered into thin sheets which are finally treated under pressure of 500 lbs. per square inch and 150° C. for 15 minutes to complete the condensation. The product is transparent, yellow colored, tough and water resistant.

The formaldehyde phenol addition product was made by heating 100 parts of phenol, 100 parts of 37% Formalin and 5 parts of ammonia for two hours under reflux conditions at atmospheric pressure. The reaction mixture was then dehydrated under vacuum at 90° C. to obtain a brittle product which was then pulverized.

Whereas only methyl acrylate-vinyl lactate copolymers are shown in the examples, other copolymers may be used in the practice of the invention. For example, the acrylic ester component may be ethyl, butyl or propyl acrylate or it may be an alkyl ester of an alpha substituted acrylic acid such as methyl methacrylate. The hydroxy acid ester component may be the vinyl ester of glycollic, lactic, citric, tartaric, salicylic, hydroxy-naphthoic or other hydroxy acids. The copolymers may be made by any of the known polymerization processes.

The aldehydic bodies used to react with the copolymers are aldehydes, polymerized aldehydes, and addition products of aldehydes with phenols, ureas, aminotriazines, e. g., melamine, etc. For example, formaldehyde, paraformaldehyde, acetaldehyde, butyraldehyde, benzaldehyde, etc., may be used. Examples of addition products useful in making the products of this invention are formaldehyde - substituted phenol, acetaldehyde-phenol, formaldehyde - aniline, formaldehyde-substituted ureas, formaldehyde-melamine, formaldehyde-ammeline, etc.

The products of this invention may be made by dissolving or dispersing the hydrophilic copolymer in water, partially reacting it with an aldehydic body, adding a curing agent and molding under heat and pressure to complete the final cure to obtain a non-fusible hydrophobic molded product.

Conversely the copolymer and the aldehydic body may be mixed dry on heated malaxating rolls, in heated Banbury mixers, or by other methods well known by the art. The mixture may then be further processed as if it were a thermoplastic resin by such processes as calendering, extruding, baking in cake form and skiving or other processes well known in the art such as injection-, compression- or transfer-molding. Regardless of the method used, the final step comprises heating the product at an elevated temperature to complete the reaction and produce an infusible hydrophobic article.

During the processing, various modifying agents such as pigments, fillers, extenders, plasticizers or colors may be added to obtain specific properties desired.

Various condensation catalysts may be incorporated in the copolymer-aldehydic mixture to hasten the condensation and cause it to go to completion. The catalysts may be acidic, such as organic or inorganic acids and acid salts, or they may be basic, such as the inorganic hydroxides, ammonia and the organic amines.

The products of this invention are transparent, tough resins. Many of them are colorless or have a light straw tint. They are insoluble in water and organic solvents and are resistant to weak acids and alkalis. They are of particular advantage where toughness, hydrophobic properties and infusibility are desired.

The foregoing description is intended to be illustrative and not limitative of the invention as embodied in the appended claims.

What I claim is:

1. A termosetting resin comprising the reaction product of 20 parts of formaldehyde with the unhydrolyzed copolymer of from 80 to 40 parts of vinyl lactate and 20 to 60 parts of methyl acrylate.

2. A thermosetting resin comprising the reaction product of 20 parts of formaldehyde with the unhydrolyzed copolymer of 80 parts of vinyl lactate and 20 parts of methyl acrylate.

THOMAS S. CARSWELL.

REFERENCES CITED

The following references are of record in the file of this patent:

UNITED STATES PATENTS

| Number | Name | Date |
| --- | --- | --- |
| 2,332,896 | D'Alelio | Oct. 26, 1943 |
| 2,332,900 | D'Alelio | Oct. 26, 1943 |
| 2,363,297 | D'Alelio | Nov. 21, 1944 |